US008657292B2

(12) United States Patent
Katz

(10) Patent No.: US 8,657,292 B2
(45) Date of Patent: Feb. 25, 2014

(54) APPARATUS AND METHOD FOR PLAYING A MODIFIED VERSION OF BACCARAT

(71) Applicant: Marcus A. Katz, Miami Beach, FL (US)

(72) Inventor: Marcus A. Katz, Miami Beach, FL (US)

( * ) Notice: Subject to any disclaimer, the term of this patent is extended or adjusted under 35 U.S.C. 154(b) by 0 days.

(21) Appl. No.: 13/721,590

(22) Filed: Dec. 20, 2012

(65) Prior Publication Data

US 2013/0116023 A1 May 9, 2013

Related U.S. Application Data

(62) Division of application No. 13/305,604, filed on Nov. 28, 2011, now Pat. No. 8,353,517, which is a division of application No. 12/090,851, filed as application No. PCT/US2007/072792 on Jul. 3, 2007, now Pat. No. 8,087,985.

(51) Int. Cl.
*A63F 1/00* (2006.01)
*A63F 13/00* (2006.01)

(52) U.S. Cl.
USPC .......................................... 273/292; 463/12

(58) Field of Classification Search
USPC ...................... 273/292, 274, 309; 463/12, 13
See application file for complete search history.

(56) References Cited

U.S. PATENT DOCUMENTS

| | | | | |
|---|---|---|---|---|
| 6,062,979 | A * | 5/2000 | Inoue | 463/12 |
| 7,335,100 | B2 * | 2/2008 | Romero | 463/11 |
| 7,775,868 | B2 * | 8/2010 | Toyoda | 463/12 |

* cited by examiner

*Primary Examiner* — Benjamin Layno
(74) *Attorney, Agent, or Firm* — Thibault Patent Group

(57) ABSTRACT

An apparatus for providing an electronic, modified version of baccarat, comprises a user interface configured to detect receipt of a first bet from a game participant prior to commencement of a round of game play, a display for displaying visual information to the game participant, a data processing unit coupled to the user interface and the display, configured to, generate two electronic card values representing an initial player hand to the player position and two electronic card values representing an initial bank hand to the bank position, cause the display to present odds relating to a likelihood of the player position beating the bank position at the conclusion of the round of game play for purposes of the game player placing a second bet on an outcome of the round of game play.

17 Claims, 3 Drawing Sheets

APPARATUS AND METHOD FOR PLAYING A MODIFIED VERSION OF BACCARAT

CLAIM OF PRIORITY

This application is a divisional of, and claims priority to, U.S. patent application Ser. No. 13/305,604, filed on Nov. 28, 2011, now U.S. Pat. No. 8,353,571 which is a divisional of U.S. patent application Ser. No. 12/090,851 filed on May 1, 2009, now U.S. Pat. No. 8,087,985 which claims priority to PCT patent application Ser. No. PCT/US2007/72792, filed on Jul. 3, 2007.

BACKGROUND

I. Field of Use

The subject matter described herein relates to techniques for operating a Baccarat game. For example, techniques for implementing late bets in a Baccarat game are disclosed.

II. Description of the Related Art

In general, commercially available versions of the game of Baccarat generally provide game participants a choice of three standard bets per hand: BANK, PLAYER and/or TIE. And while other side bets are sometimes accepted, both standard bets and side bets are accepted by casinos only prior to the beginning of each hand.

SUMMARY

In one embodiment, an apparatus for providing an electronic, modified version of baccarat is described, comprising a user interface configured to detect receipt of a first bet from a game participant prior to commencement of a round of game play, the first bet relating to a player position beating a bank position, the bank position beating the player position, or a tie between the bank position and the player position at the conclusion of a round of game play, a display for displaying visual information to the game participant, a data processing unit coupled to the user interface and the display, configured to, generate two electronic card values representing an initial player hand to the player position and two electronic card values representing an initial bank hand to the bank position, cause the display to present the initial player hand and the initial bank hand to the game participant, and cause the display to present odds relating to a likelihood of the player position beating the bank position at the conclusion of the round of game play for purposes of the game player placing a second bet on an outcome of the round of game play.

In another embodiment, an apparatus for providing an electronic, modified version of baccarat is described, comprising a user interface configured to detect receipt of a first bet from a game participant prior to commencement of a round of game play, the first bet relating to a player position beating a bank position, the bank position beating the player position, or a tie between the bank position and the player position at the conclusion of a round of game play, a display for displaying visual information to the game participant, a data processing unit coupled to the user interface and the display, configured to, generate two electronic card values representing an initial player hand to the player position and two electronic card values representing an initial bank hand to the bank position, cause the display to present the initial player hand and the initial bank hand to the game participant, determine whether the initial player hand will receive an additional electronic card value based on the rules of baccarat, and allow a second bet from the game participant if the data processing unit determines that the initial player hand will receive an additional electronic card value.

The subject matter of this disclosure can be implemented as computer program products, tangibly embodied in a computer or machine readable medium. Such computer program products may cause a data processing apparatus to conduct one or more operations described herein.

Similarly, systems are also described that may include a processor and a memory coupled to the processor. The memory may encode one or more programs that cause the processor to perform one or more of the method acts described herein.

Further, features described in this specification can be implemented as one or more methods or processes.

The subject matter described herein provides many advantages. For example, the opportunity to place late bets on BANK, PLAYER and TIE based on changing odds can make the game if Baccarat far more challenging and fun for the game participants. In addition, the late bets can provide additional play and revenues for casinos.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Figure 1:
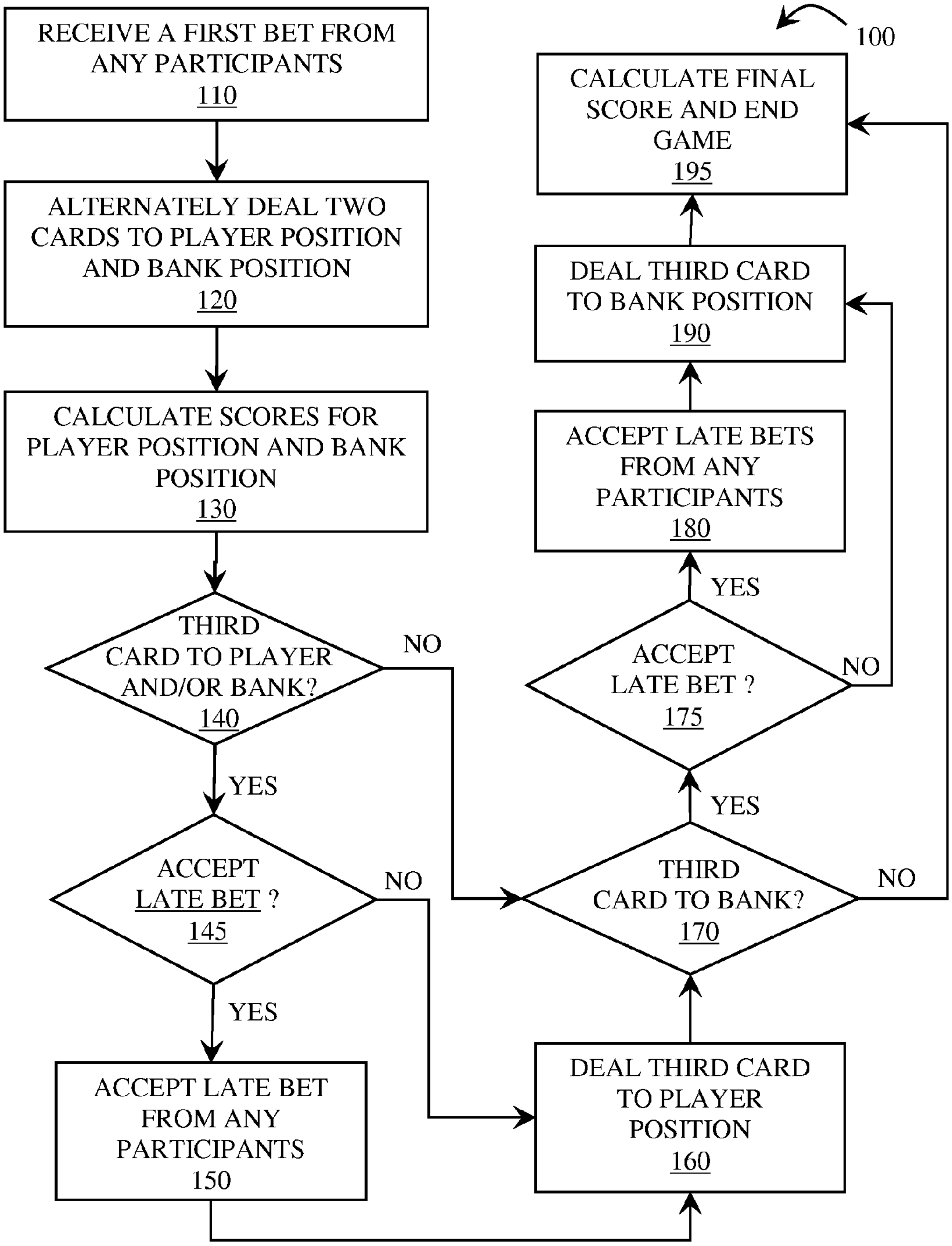
FIG. 1 is process flow diagram of a process for implementing late bets in a game of Baccarat.

Techniques for implementing late bets in a game of Baccarat are disclosed. In contrast to bets that are required to be placed before the beginning of a hand, late bets are based on changing odds of winning as the game progresses.

Baccarat is a simple gambling card game with only three possible results: (1) Player, (2) Bank and (3) TIE. The term Player does not refer to a game participant, and the term Bank does not refer to the house. Player, Bank and TIE are merely names of three betting options from which a game participant can choose.

Baccarat, as played on a table in a casino, is generally played with 8 decks of cards dealt from a container known as a shoe. The shoe facilitates efficient dealing while decreasing the chance of cards being prematurely exposed by the dealer. Baccarat, in its electronic form, as played on-line or by machine in a casino, may use electronic decks of cards and shoes in which shuffles do not occur until the end of the shoe as in table games using real cards. However, in some cases, electronic games may be designed to reshuffle the cards after each hand is played.

Scoring in Baccarat involves the assignment of points corresponding to the face value of each card. The suit and color does not matter in determining the value of each card. Aces are worth 1. Each numbered card less than ten is worth its face value. Tens and face cards are worth 0. Further, the score of a hand is determined by the right digit of the total value of the cards. For example, if the cards dealt are an 8 and a 7 (of any suit or color), the total value is 15 but the score for the hand would be 5. If the cards dealt are an 8, 7 and a 6, the total value is 21 but the score would be 1. The scores always range from 0 to 9, and it is impossible to bust as in the game of blackjack. The winning hand is determined by identifying the hand with a score closest to 9 at the end. Matching scores at the end are considered a TIE. In case of a TIE, bets on TIE win and bets on the Bank and Player positions are returned.

Baccarat is a game that tends to attract high stakes because (with the exception of the TIE bet) the game provides extremely close odds, as can be seen in Table 1 below.

TABLE 1

Traditional Baccarat Bets

| | | Calculating Odds | Net Odds |
|---|---|---|---|
| Bet on Bank | Winning | 50.68% × 0.95 | 48.15% |
| (Pays 1-1 less 5% commission) | Hand | | |
| 1-1 is verbally spoken as 1 to 1 | Losing Hand | 49.32% × 1.00 | 49.32% |
| | House Edge | | 1.17% |
| Bet on Player | Winning | 49.32% × 1.00 | 49.32% |
| (Pays 1-1 with no commission) | Hand | | |
| | Losing Hand | 50.68% × 1.00 | 50.68% |
| | House Edge | | 1.36% |
| Bet on TIE | Winning | 9.54% × 8.00 | 76.32% |
| (Pays 8-1 with no commission) | Hand | | |
| 8-1 is oftentimes described as | Losing Hand | 90.46% × 1.00 | 90.46% |
| 9 for 1 | House Edge | | 14.14% |

Traditionally, the bets on BANK, PLAYER and TIE are placed by game participants prior to the beginning of each hand. In some instances, various supplemental bets may be allowed by some casinos, but in all cases, these early bets are placed when the odds of winning or losing, as described in Table 1, are static since no cards have been dealt yet. Late bets, as described in this specification, are based on the changing odds of winning as the hand progresses. The opportunity to place late bets on BANK, PLAYER and TIE based on changing odds can make the game of Baccarat far more challenging and fun for the game participants, while simultaneously producing additional play and revenues for casinos. These late bets could be placed without respect to (1) whether the game participant had placed a bet prior to the beginning of the hand and (2) without respect to whether a game participant's first bet was on BANK or PLAYER and/or TIE and/or any side bet allowed.

FIG. 1 is a process flow diagram showing a process 100 for implementing late bets in a game of Baccarat. A traditional game of Baccarat starts with one or more participants placing a traditional bet (e.g., bet on Player position, bet on Bank position or bet on TIE prior to the start of the hand.) This first bet is received from one or more of the participants at 110. A dealer alternately deals two cards to a Player position and another two cards to a Bank position at 120. A score is determined, according to the rules of Baccarat as described above, for the Player position and the Bank position at 130. At 140, a determination is made whether a third card should be dealt to the Player position and/or the Bank position by considering the following:

Player and Bank positions both stand, or
Player position stands, Bank position draws third card, or
Bank position stands, Player position draws third card, or
Player and Bank positions both draw a third card or
Player position draws third card, Bank position sometimes draws third card.

The determination at 140 above is made using the following standard Baccarat drawing rules:

1. If either the Player position or the Bank position has a total of an 8 or 9, each position stands and the hand is over. This rule overrides all other rules.

2. If both the Player position and the Bank position have a total of 6 or 7, each position stands and the hand is over. This rule overrides the rules below.

3. The Player position always stands on a 6 or 7 and draws on 0-5.

4. The Bank position always stands on a total of 7, draws on 0-5 if the Player position stands, but if the Player position is not going to stand, is guaranteed a draw on 0-2 only.

5. In cases in which the Player position is not going to stand and the Bank position has a total of 3 to 6, the determination on whether the Bank position does or does not receive a third card is based on the value of the third card received by the Player position. In these cases the Bank position draws a third card if the Bank position's starting total is (a) 3 and the Player position's third card is an A-7, 9 or 0 value card (any card but an 8)

(b) 4 and the Player position's third card is a 2-7

(c) 5 and the Player position's third card is a 4-7

(d) 6 and the Player position's third card is a 6-7

When the determination at 140 is that a third card should be dealt to the Player position, another determination is made at 145 to decide whether to accept Late bets (e.g., based on established policy of the casino or the online gaming site). When the determination at 145 is to accept late bets, all participants, may be allowed to place a late bet at 150 prior to the receipt of the Player's third card at 160. When required, based on the standard Baccarat drawing rules described above, the third card is dealt to the Player position at 160. After the third card is dealt to the Player position, if the determination was not made at 140 to definitely or definitely not deal a card to the Bank position, then a determination may be required at 170 to decide whether to deal a third card to the Bank Position. In this case, the determination on whether or not a third card will be dealt to the Bank position is dependent upon the value of the third card drawn by the Player position (see, standard Baccarat drawing rules above). When the determination at either 140 or 170 is that a third card should be dealt to the Bank position, then another determination is made at 175 to decide whether late bets are accepted (e.g., based on established policy of the casino or online gaming site). When determined that late bets are accepted at 175, all participants may be allowed to place a late bet at 180 prior to dealing a third card to the Bank position at 190. The third card is dealt to the Bank position at 195 when required (e.g., based on standard Baccarat drawing rules).

When the determination at 140 is that a third card should not be dealt to the Player position, then a determination is made at 140 to decide whether a third card should be dealt to Banker position. When the determination at 140 is to deal the third card to Bank position, the process 100 moves to 175 to determine if late bets should be accepted from any participants, based on the established policy of the casino or the online gaming site, before dealing the third card to the Bank position at 190. When the determination at 175 is that late bets are not accepted (e.g., based on established policy of the casino or the online gaming site), the process 100 moves to deal the third card to the Bank position at 190 without accepting any late bets. Then, the final score is determined and the game ends at 195. When the determination at 170 is that a third card is not to be dealt to the Bank position (which may be independent of whether a third card was dealt to the Player position), the process 100 moves to determine the final score and the game ends at 195 without dealing third card to the Bank position or accepting late bets. When the determination at 145 is that late bets are not accepted (e.g., based on established policy of the casino or the online gaming site), the process 100 also moves to deal a third card to the Player position without accepting any late bets.

In cases in which both the Bank and Player positions receive a third card (e.g., by the process 100 performing 140, 145, 150, 160, 170, 175, 180, 190 and 195), a total of two late bets may be accepted from each participant—one at 145 and another at 175. Since accepting the late bets at 145 and 175 may depend on the established policy of the casino or the online gaming site, the game can end at 195 with one, two or zero rounds of late bets being accepted. As previously noted, no late bets based on changing odds are allowed in traditional Baccarat.

Assume, for example, that after the first two cards are dealt to each position, the Player position trails the Bank position by a score of 7 to 2. In this particular case, the rules of Baccarat entitle the Player position to receive a third card. Here, each casino would have the option of accepting a late bet from any participant at 150 (before the third card is dealt to the Player position at 160). The odds offered to participants by the casino on this late bet would be determined by the casino based on the then current odds of a Tie hand occurring, or a win by the Bank and Player positions. In this particular case, the Bank position would be favored to win by approximately 5 to 1 (without taking into consideration the effect of the specific cards previously removed from the shoe). In this example, a casino would have pre-established and published a written policy in regard to offering late bets on TIE, the Bank position or Player position at odds that will ensure the casino will maintain an edge, or the casino may have pre-established and published a written policy not to accept a late bet on this particular play (or any other play).

In the example above, if the casino had established a written policy to accept late bets on this particular play (Player 2, Bank 7), all game participants would be entitled to place a late bet at the odds determined by the casino, which, in the case of a table game, would be based on combination of the current score and the particular cards that had already been removed from the shoe. However, in an electronic game in which the cards are reshuffled prior to each hand, it's likely that the odds would be determined solely by the score. For example, a table game participant who originally bet $1,000 on Player position who believes that he is going to lose the original wager on a bet on the Player position, might decide to place a $5,000 late bet on the Bank position. In this case, if the Bank Position holds on to win and assuming the late bet odds offered by the casino on the Bank position were 1-5, the game participant wins $950 ($1,000 less $50 commission) on the late bet, which will cover most of the loss related to the initial bet on Player Position. However, if Player Position were to draw (on the third card dealt) a 6 or 7, the game participant who made the original bet on the Player position and the late bet on the Bank position, would end up $4,000 worse off by winning the original $1,000 bet on the Player position but losing the late bet of $5,000 on the Bank position.

In the late bet example above, a game participant who originally bet $1,000 on the Bank position might decide to hedge that initial bet by making a late bet of $500 on the Player position. In this case, if the Bank position holds on for a win, the game participant's net win will be $450 (a $1,000 win on the initial bet on the Bank position less $50 (5% commission) less the $500 loss on the late bet made on the Player position. However, if the Player position should pull out the win by drawing a 6 or 7, the game participant still wins a net of $1,500 ($2,500 win [assuming the odds offered by the casino were 5-1] on the late bet on the Player position less the $1,000 loss on the initial bet on the Bank position). Without the hedge bet this game participant would have lost the entire initial bet of $1,000.

In the same late bet example discussed above, a game participant might decide to make a late bet on TIE. In this case, prior to when the third card is dealt to the Player position, the approximate odds against a tie (without taking into consideration the effect of the specific cards previously removed from the shoe) would be 11-1 as opposed to only 8-1 if the TIE bet had been placed prior to the beginning of the hand (i.e., initial bet). In this case the casino might choose to offer odds of 11 for 1 (10 to 1).

The late bet example discussed above in which the Player position trails the Bank position by a score of 7-2 after the first two cards have been dealt is just one of many described above. The standard baccarat drawing rules (e.g., Nos. 3-5), all of which could, depending upon the policies established by the casino, provide similar opportunities for game participants to place a new bet on either the Player position or the Bank position, increase their original bet, hedge their original bet by changing sides or make a new or additional bet on Tie. As described, each of the late bet examples in a table game would offer odds based on a combination of the current score and the cards that have already played during the shoe. But as discussed above, in an electronic game in which the cards are reshuffled prior to each hand, it's likely that the odds would be determined solely by the score. In either case, table or electronic, these late bet opportunities would be a first for the game of Baccarat.

Figure 2A:
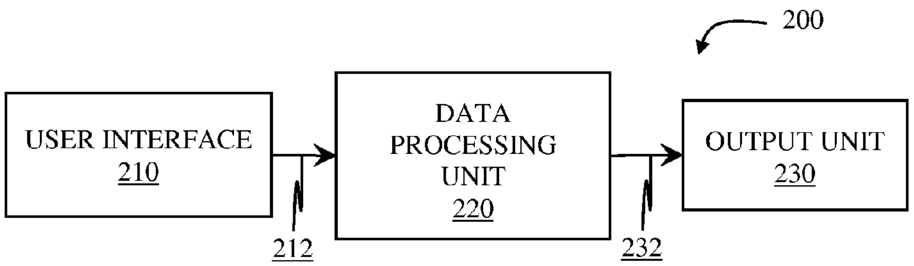
FIG. 2A is a block diagram of a system for implementing late bets in a game of Baccarat.

FIG. 2A is a block diagram of a system 200 for implementing the late bets in a game of Baccarat. The system 200 includes a user interface unit 210, a data processing unit 220 and an output unit 230. The user interface 210 is communicatively coupled to the data processing unit through a communication link 212. Likewise, the output unit 230 is communicatively coupled to the data processing unit 220 through a communication link 232.

The communication links 212 and 232 can provide either unidirectional or bidirectional communications, and can be combined into a single, shared communication channel (e.g., a bus network). The communication links 212 and 232 can be implemented using a wired protocol, such as Universal Serial Bus (USB), FireWire, or other suitable connections. Alternatively, the communication links 212 and 232 can be implemented using a wireless protocol, such as Bluetooth, WiFi, WiMax, etc.

Figure 2B:
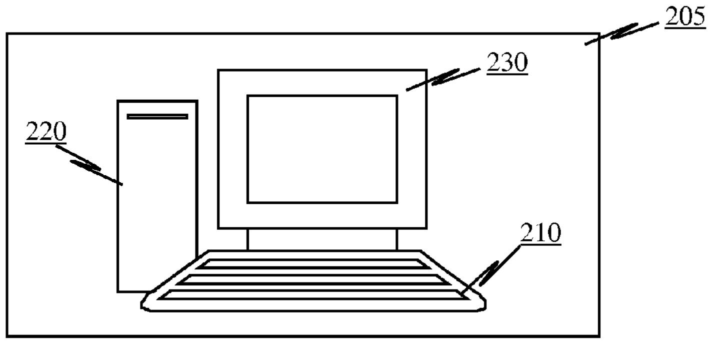
FIG. 2B is a block diagram of a stand alone system for implementing late bets in a game of Baccarat.

As shown in FIG. 2B, the system 200 can be implemented using a stand alone computer system 205. The computer system can include the output unit 230, the user interface device unit 210 and the data processing unit 220. The computer system 210 can include at least a processor 212 and a memory 214. The processor data processing unit 230 can include a central processing unit (CPU), or other suitable processor/hardware such as an application specific integrated circuit (ASIC). The computer system 205 can optionally include other computer components such as a memory unit (not shown) can be a volatile or non-volatile memory unit used to store and execute computer executable instructions. The output unit 230 can include a liquid crystal display (LCD) or other suitable display devices. The computer system 205 can be implemented as a stand alone gaming machine, for example, such as a video poker machine prevalent in a casino.

Figure 2C:
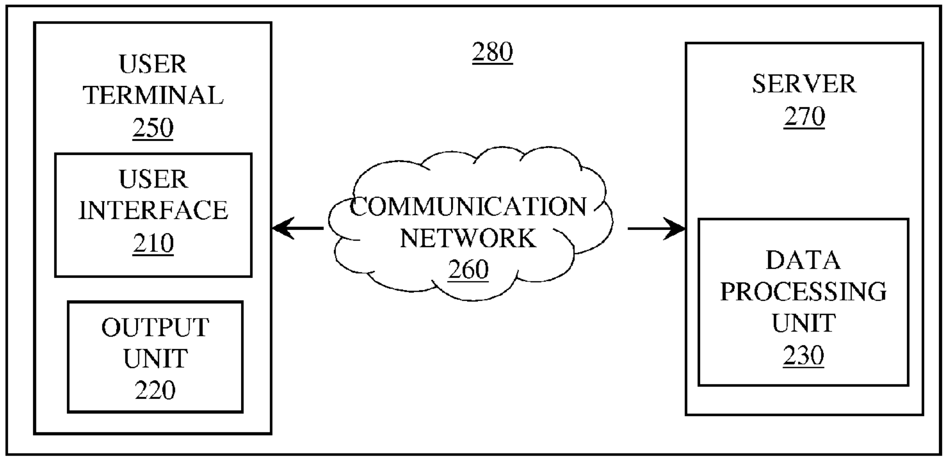
FIG. 2C is a block diagram of a network system for implementing late bets in a game of Baccarat.

In some implementations, the system 200 can be implemented as a network system 280 as shown in FIG. 2C. The network system 280 includes a user terminal 250 communicatively coupled to a server 270 over a communication network 260. The communication network can include the internet, local area network (LAN), wide area network (WAN), WiFi, WiMax, etc. The user terminal 250 can include the user interface unit 210 and the output unit 230. The server 270 can include the data processing unit 220. The network system 280 can be implemented as an online Baccarat game, where a remote user interfacing with a user terminal 250 (e.g., a personal computer) communicates with the server 270. The online Baccarat game is managed and executed by the data processing unit 230.

In a casino Baccarat game using actual playing cards, the data processing unit 230 can be used by the casino to determine the odds for placing late bets as described above. Alternatively, in a casino Baccarat game machine (e.g., similar to a video poker machine) or an online Baccarat game, the user interface unit 210 is used to receive bets placed by the game participant in addition to any other user interactions. The data processing unit 230 manages one or more computer programs that when executed cause the Baccarat game machine (data processing device) to perform various functions, such as (1) dealing the cards to the Player Position and the Bank Position; (2) determine scores for both positions; (3) determine whether a third card should be dealt to the Player Position and/or the Bank; (4) determine odds (probabilities) for late bets in real-time; (5) determine whether late bets should be received from the game participant Position; (6) determine the final scores for both positions; and (7) determine the winners.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "information carrier" comprises a "machine-readable medium" that includes any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal, as well as a propagated machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although a few variations have been described in detail above, other modifications are possible. For example, the logic flow depicted in the accompanying figures and described herein does not require the particular order shown, or sequential order, to achieve desirable results.

Figure 3A:
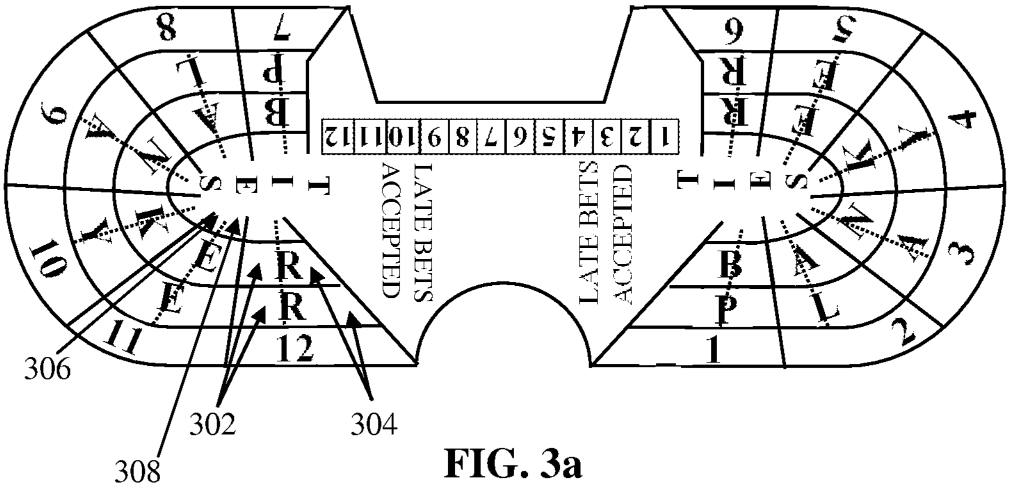
FIGS. 3A and 3B are top down views of modified Baccarat Tables
Figure 3B:
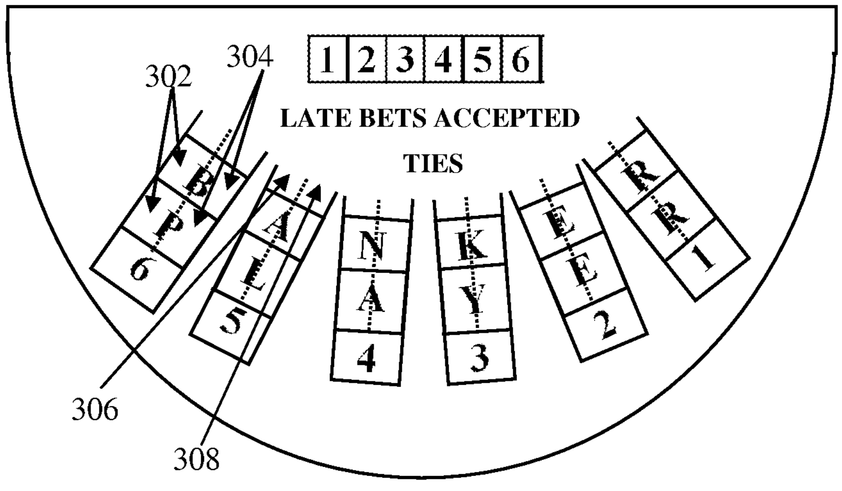

In particular, the Baccarat game table layouts could be slightly altered to accommodate late bet opportunities or late bets could be accommodated on existing table layouts by the casino's designation of a spot on the table for those bets. FIGS. 3*a* and 3*b* are example diagrams of a Baccarat game table layout that shows how late bets may be accommodated. FIG. 3*a* illustrates a BIG BACCARAT table and FIG. 3*b* illustrates a MINI BACCARAT table. Initial bets on the Bank and Player positions could be placed to the left 302 of the letter appearing in the game participants' betting spots and late bets to the right 304 of the same letter. For bets on TIE, initial bets could be placed on the left 306 of the space traditionally used for TIE bets, and late bets place on the right 308 of the same space. The difference between a BIG BACCARAT table and a MINI BACCARAT table is that the MINI BACCARAT table is set up like a blackjack table with a single dealer on one side of the table and game participants on the other side.

Also, while it would be theoretically possible for a casino to allow late bets prior to each draw during the hand, live table games require the casino to consider the practicality of being able to offer bets that are convenient to place, track and pay off at the table. Accordingly, late bets prior to every possible draw would likely, but not necessarily, be limited to electronic or on-line versions of Baccarat.

At live table games in a casino, the implementations described may be limited to late bets on the final draw of the hand. In such implementations, casinos may choose to develop rules and procedures that will allow them to offer certain late bets without the utilizing technology to determine the changing odds in real-time.

In the examples of late bets described above, the actual odds offered to the game participant by the casino could be adjusted based on the casino's preferences, but the examples chosen illustrate the attractiveness and simplicity of the late bet concept from both the casino's and the game participant's point of view.

I claim:

1. An apparatus for providing an electronic, modified version of baccarat, comprising:

a user interface configured to detect receipt of a first bet from a game participant prior to commencement of a round of game play, the first bet relating to a player position beating a bank position, the bank position beating the player position, or a tie between the bank position and the player position at the conclusion of a round of game play;

a display for displaying visual information to the game participant;

a data processing unit coupled to the user interface and the display, configured to:

generate two electronic card values representing an initial player hand to the player position and two electronic card values representing an initial bank hand to the bank position;

cause the display to present the initial player hand and the initial bank hand to the game participant; and cause the display to present odds relating to a likelihood of the player position beating the bank position at the conclusion of the round of game play for purposes of the game player placing a second bet on an outcome of the round of game play.

2. The apparatus of claim 1, wherein the data processing unit is further configured to:

determine whether the initial player hand will receive an additional electronic card value based on the rules of baccarat;

generate the additional electronic card value;

cause the display to present the additional electronic card value to the game participant; and cause the display to present second odds relating to a likelihood of the player position beating the bank position at the conclusion of the round of game play.

3. The apparatus of claim 2, wherein data processing unit is further configured to:

determine whether the initial player hand will receive an additional electronic card value based on the rules of baccarat; and the user interface is further configured to allow the second bet from the game participant if the data processing unit determines that the initial player hand will receive an additional electronic card value.

4. The apparatus of claim 3, wherein the second bet comprises a bet that the player position will beat the bank position at the conclusion of the round of game play.

5. The apparatus of claim 1, wherein the data processing unit is further configured to:

determine whether the initial player hand will receive an additional electronic card value based on the rules of baccarat;

generate the additional electronic card value;

cause the display to present the additional electronic card value to the game participant; and cause the display to present second odds relating to a likelihood of the bank position beating the player position at the conclusion of the round of game play.

6. The apparatus of claim 5, wherein:

the data processing unit is further configured to allow the second bet from the game participant if the data processing unit determines that the initial player hand will receive an additional electronic card value.

7. The apparatus of claim 6, wherein the second bet comprises a bet that the bank position will beat the player position at the conclusion of the round of game play.

8. The apparatus of claim 1, wherein:

the data processing unit is further configured to determine whether the initial player hand will receive an additional electronic card value based on the rules of baccarat; and the user interface is further configured to receive the second bet from the game participant if the data processing unit determines that the initial player hand will receive an additional electronic card value.

9. The apparatus of claim 8, wherein the second bet comprises a bet relating to the player position beating the bank position, the bank position beating the player position, or a tie between the bank position and the player position at the conclusion of the round of game play.

10. The apparatus of claim 8, wherein:

the data processing unit is further configured to determine whether the initial bank hand will receive an additional electronic card value based on the rules of baccarat; and the user interface is further configured to receive a third bet from the game participant if the data processing unit determines that the initial bank hand will receive an additional electronic card value.

11. The apparatus of claim 10, wherein the third bet comprises a bet relating to the player position beating the bank position, the bank position beating the player position, or a tie between the bank position and the player position at the conclusion of the round of game play.

12. The apparatus of claim 1, wherein:

the data processing unit is further configured to determine whether the initial bank hand will receive an additional electronic card value based on the rules of baccarat; and the user interface is further configured to receive the second bet from the game participant if the data processing unit determines that the initial bank hand will receive an additional electronic card value.

13. The apparatus of claim 12, wherein the second bet comprises a bet relating to the player position beating the bank position, the bank position beating the player position, or a tie between the bank position and the player position at the conclusion of the round of game play.

14. An apparatus for providing an electronic, modified version of baccarat, comprising:

a user interface configured to detect receipt of a first bet from a game participant prior to commencement of a round of game play, the first bet relating to a player position beating a bank position, the bank position beating the player position, or a tie between the bank position and the player position at the conclusion of a round of game play;

a display for displaying visual information to the game participant;

a data processing unit coupled to the user interface and the display, configured to:

generate two electronic card values representing an initial player hand to the player position and two electronic card values representing an initial bank hand to the bank position;

cause the display to present the initial player hand and the initial bank hand to the game participant;

determine whether the initial player hand will receive an additional electronic card value based on the rules of baccarat; and allow a second bet from the game participant if the data processing unit determines that the initial player hand will receive an additional electronic card value.

15. The apparatus of claim 14, wherein the second bet comprises a bet relating to the player position beating the bank position, the bank position beating the player position, or a tie between the bank position and the player position at the conclusion of the round of game play.

16. The apparatus of claim 14, wherein the data processing unit is further configured to:

generate odds relating to a likelihood of the player position beating the bank position at the conclusion of the round of game play; and cause the display to present the odds to the game participant.

17. The apparatus of claim 16, wherein the data processing unit is further configured to:

determine whether the initial bank hand will receive an additional electronic card value based on the rules of baccarat;

if the initial bank hand will receive an additional electronic card value, generate odds, for presentation via the display, relating to a likelihood of the player position beating the bank position at the conclusion of the round of game play.

* * * * *